May 30, 1944.
C. I. SMITH ET AL
2,350,075
HOLDING DEVICE FOR FOOD CONTAINERS IN
REFRIGERATING DISPENSING CABINETS
Filed Aug. 21, 1943
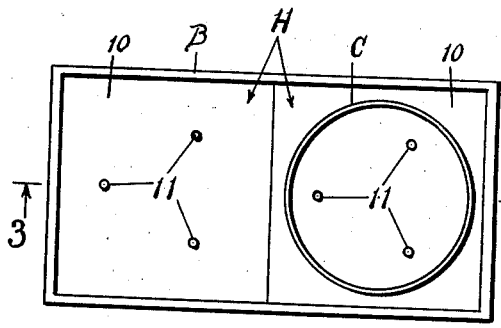
Fig. 1
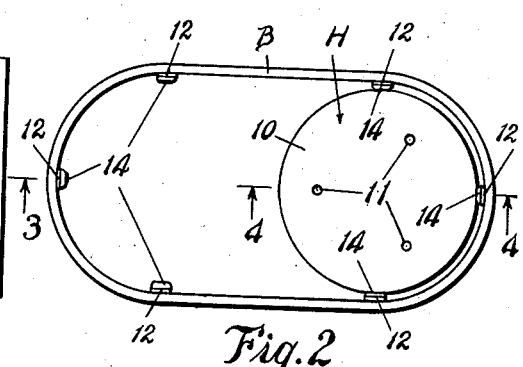
Fig. 2
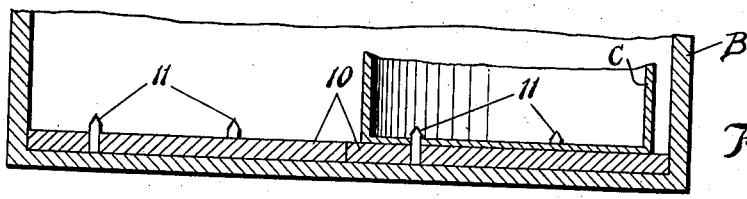
Fig. 3
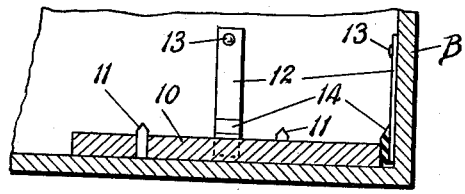
Fig. 4
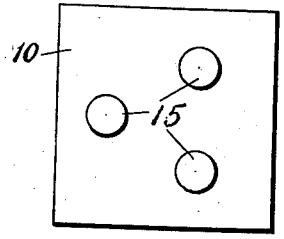
Fig. 7
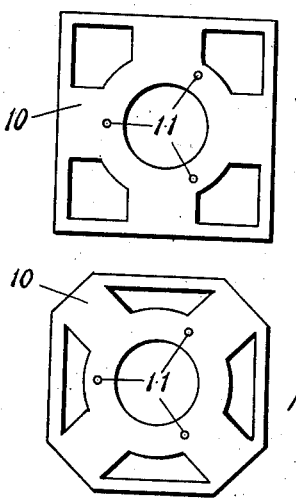
Fig. 6
Fig. 5
INVENTORS
Charles I. Smith & Thomas J. Ball.
BY Henry Molz
ATTORNEY.

Patented May 30, 1944

2,350,075

UNITED STATES PATENT OFFICE 2,350,075

HOLDING DEVICE FOR FOOD CONTAINERS IN REFRIGERATING DISPENSING CABINETS

Charles I. Smith, Glendale, and Thomas J. Ball, Pasadena, Calif.

Application August 21, 1943, Serial No. 499,738

4 Claims. (Cl. 248—346)

The primary object of our invention is to provide a holding device of the character described, whereby food containers (not necessarily limited to such, however), positioned in a refrigerating dispensing cabinet, ice cream and ice milk cabinets, for example, are held removably secured against rotation.

An object of our invention is the provision of such a holding device whereby the food container is automatically secured as aforesaid without the necessity of manipulating or in any other manner manually or otherwise securing the container thereto.

A still further object of our invention is to provide a holding device of said character whereby the contents of the container may readily be dispensed as to assure a full measure of sales return in dispensing the product regardless of nature, in the container contained.

And a still further object is the provision of a container holding device adaptable to varying types and styles of container securing means, and whereby containers of varying materials may be adequately held by the device in removably secured relation within the dispensing cabinet.

We attain these objects by the holding device illustrated in the accompanying drawing, in which:

Figure 1 is a plan view showing one of the container holding devices positioned in a square type of refrigerating dispensing cabinet;

Figure 2 is a similar view but showing the same positioned in a dispensing cabinet having rounded ends;

Figure 3 is a longitudinal section through Fig. 1 on line 2—2;

Figure 4 is a fragmentary longitudinal sectional view through Fig. 2 on line 4—4;

Figure 5 is a plan view of two modified forms of the container holder base or plate;

Figure 6 is a view of a plurality of gripping pins of various styles and shapes. Any one therefore may readily be used in substitution for the gripping pin 11 shown in Figures 3 and 4, and Figure 7 is a plan view of a modified container holder incorporating a plurality of suction cups 15 whereby adequate holding of a container placed thereon is provided under vacuum and against rotation, yet removable at will.

Similar letters and numerals of reference indicate like parts throughout the several views. Thus, the container holder or support H embodies a base or plate 10 having a plurality of pin gripping members 11 fixed therein with their sharpened points projecting slightly above the top surface so as to fully penetrate the bottom of a container C forced thereon in its placement within a refrigerating cabinet B. While we show but three of said pin gripping members 11, it is obvious that less or more than three may as readily be incorporated in the base or plate 10.

The base or plate 10 is preferably shaped so that it snugly contacts the sides of the refrigerator cabinet B, said snug fit preventing the holder H from rotating when the contents of a container disposed thereon, ice cream, for example, is scooped therefrom in a concentric manner as is common practice in the trade with this class of food product. On the other hand, in cabinets of the rounded end type, and requiring a rounded base or plate as is indicated in Fig. 2, flat springs 12 may be secured to either the inside cabinet wall by suitable means such as a nail 13, as shown, or directly to the edge of the holder plate (not shown) as may be preferred. The base or plate, too, may be built directly into the cabinet whereby irrespective of shape, the manner of building in would manifestly adequately secure the holder C to the cabinet against rotation. Compressible rubber pads 14 secured or moulded adjacent the lower ends of the spring 12 present frictional contact with the contacting surfaces as the case may be.

The invention has reference more particularly to containers manufactured of paper, fibre and similar light weight wood or pulp products as are more commonly employed in the packaging of many commodities, ice cream and ice milk products, as aforementioned, for example, although not necessarily limited to such, and wherein the product is delivered to the retail trade for dispensing to customers in lesser quantities.

Such containers, for example, as are employed in the ice cream industry when placed in the retail store dispensing cabinet have nothing to hold them against rotation. When the ice cream is dispensed therefrom in the accepted method of the trade by a concentric movement of the scoop around the inner side wall of the container, as opposed to scooping from the center, the movement causes the container to rotate. This greatly restricts the concentric movement of the scoop, and materially retards dispensing of the product. By reason thereof, center scooping to a great extent prevails. Experience has proven that it is a costly method of dispensing ice cream, for example in that it creates a definite loss of gallonage, and makes impossible uniform serving of the product to both retailer and customer alike.

With our device which may be built into newly constructed dispensing cabinets as well as readily added to existing cabinets, the mere placement of the container in the cabinet automatically holds it firmly against rotation, and this, irrespectively of the concentric force employed in scooping the product. To remove the container from the dispensing cabinet, whether it be full, empty or partially so, one merely lifts it upwardly and out. Our container holder incorporates no fastening means, yet firmly holds a container in removably secured relation against rotation within the dispensing cabinet.

The varying styles of pin gripping members disclosed in Fig. 6 are permissible variations from the round sharp pointed member 11 shown in the several views. The type best suited for one material, the paper ice cream container in common use, for example, may not as adequately serve the purpose as one of the other styles if the container structure be of a different material. Other than this, the several pin gripping members are designed to serve a like purpose, to adequately but removably secure the container against rotation when gripped thereby, and from sliding while in the cabinet contained.

Readily produced from suitable materials the market affords, and at no great cost, our container holding device is thoroughly sanitary, light in weight, and ideal for the purpose disclosed. It may be produced in the respective sizes and shapes to readily fit into any cabinet, has no objectionable features, and is of material advantage to the retailer by its positive elimination of dispensing losses, and to the customer in the more uniform quality of the product received.

We are aware that slight modifications in structure and in arrangement may from time to time be made without departing, however, from the scope of the present invention, and as defined in the claims which are appended hereto. For example, we realize that the base or plate 10 could readily be constructed with a number of grooves or notches of sufficient depth to fully engage as many pins detachably encircled around the bottom of the container C by means of a band attached thereto. Moreover, in its manufacture, the pins could readily be incorporated in the container structure so as to extend therefrom for engagement with the grooves or notches in the base or plate contained, and whereby rotation of the container would be checked. Either manner of structure, we believe, would readily fall within the scope of our invention. Hence, we do not limit our said invention to the exact description herein disclosed, but what we do claim is:

1. In combination, a box-like cabinet having bottom and side walls and open at its top, a container mounted in said cabinet so that the contents thereof may be dispensed therefrom thru the open top of the cabinet, a plate-like support mounted on the bottom wall of the cabinet as a seat for the lower end of the container, and pin-like projections extending upwardly from said support and penetrating a wall of the container to hold the latter against turning on lateral movement relative to said support while the contents of the container is being removed, said container being removable from said pin-like projections and the cabinet by forcibly lifting the container upwardly.

2. In combination, a box-like cabinet having bottom and side walls and open at its top, a container mounted in said cabinet so that the contents thereof may be dispensed therefrom thru the open top of the cabinet, a plate-like support mounted on the bottom wall of the cabinet as a seat for the lower end of the container, and pin-like projections extending upwardly from said support and penetrating a wall of the container to hold the latter against turning or lateral movement relative to said support while the contents of the container is being removed, said container being removable from said pin-like projections and the cabinet by forcibly lifting the container upwardly, and a gripping member frictionally engaging a side of the container to aid in holding the container against turning during the removal of the contents thereof.

3. In combination, a box-like cabinet having bottom and side walls and open at its top, a container mounted in said cabinet so that the contents thereof may be dispensed thru the open top of said cabinet, a plate-like support mounted on the bottom wall of the cabinet as a seat for the lower end of the container, and pin-like projections extending upwardly from said support and penetrating a wall of the container to hold the latter against turning or lateral movement relative to said support while the contents of the container is being removed, said container being removable from said pin-like projections and the cabinet by forcibly lifting it upwardly therefrom, spring members fixed to side walls of the cabinet and rubber gripping pads carried by said spring members and gripping the sides of the container to assist in holding the same against turning or shifting during removal of the contents thereof.

4. In a device for holding a loaded container against displacement and rotary movement relative to the support therefor while the contents of the container are being removed, a plate-like support as a seat for the lower end of the container, pins carried by and projecting upwardly from said support for penetrating the lower end of the container, and yieldable gripping members stationary relative to and above said support for engaging the side of the container to assist in holding it in place while the contents thereof are being removed.

CHAS. I. SMITH.
THOMAS J. BALL.